United States Patent [19]
Welch et al.

[11] Patent Number: 5,753,340
[45] Date of Patent: May 19, 1998

[54] COMPOSITES AND MULTI-COMPOSITES

[75] Inventors: William L. Welch, Houston; Don W. Sluder; Richard L. Cory, both of Lake Jackson, all of Tex.

[73] Assignee: Welch-Sluder IP Partners, Houston, Tex.

[21] Appl. No.: 508,165

[22] Filed: Jul. 27, 1995

[51] Int. Cl.$^6$ .................. B32B 3/12; E01C 11/22; E01F 5/00
[52] U.S. Cl. .................. 428/117; 404/2
[58] Field of Search .................. 428/117

[56] References Cited

U.S. PATENT DOCUMENTS

| | | | |
|---|---|---|---|
| 2,744,042 | 5/1956 | Pace | 428/117 |
| 4,330,494 | 5/1982 | Iwata et al. | 428/117 |
| 4,940,359 | 7/1990 | Van Duyn et al. | 405/118 |
| 5,213,438 | 5/1993 | Bärenwald | 404/2 |
| 5,545,458 | 8/1996 | Fukushima et al. | 428/117 |

*Primary Examiner*—James C. Cannon
*Attorney, Agent, or Firm*—Kurt S. Myers

[57] ABSTRACT

The present invention is directed to composites and multi-composites of a prefabricated core of a cellulosic honey comb filled with a rigid polyurethane and layers of fiber saturated thermoset resins. More specifically, the present invention is directed to composites and multi-composites of a cellulosic honey comb filled with rigid polyurethane prefabricated core and a fiber reinforced material, either fibers or woven fibers selected from the group consisting of glass, polyester, carbon and aramid fibers as a mat or cloth saturated with a thermoset resin selected from the group consisting of catalyzed polyester, amine catalyzed epoxy, catalyzed vinyl ester and acid catalyzed furan resins.

8 Claims, 2 Drawing Sheets

COMPOSITES AND MULTI-COMPOSITES

FIELD OF THE INVENTION

The present invention is directed to composites and multi-composites of a prefabricated core of a cellulosic honey comb filled with a rigid polyurethane and layers of fiber saturated thermoset polymerized resins. More specifically, the present invention is directed to composites and muticomposites of a cellulosic honey comb filled with rigid polyurethane prefabricated core and a fiber reinforced material saturated with thermoset polymerized resins.

BACKGROUND OF THE INVENTION

Drainage systems using precast and molded sections are known as exemplified by U.S. Pat. No. 4,940,359 and U.S. Pat. No. 5,213,438.

U.S. Pat. No. 4,940,359 discloses an elongate safety conduit or trench for receiving chemical liquids, having first and second preassembled conduit elements, the first located and retained within the second.

U.S. Pat. No. 5,213,438 discloses an elongate safety conduit or trench for receiving chemical liquids, having inner and outer preassembled conduit elements. The outer element is greater in width and depth than the inner element to accommodate the longitudinal slope of the inner element while providing a space beneath the inner element to collect any fluid leakage.

SUMMARY OF THE INVENTION

The present invention is directed to composites and multi-composites of a prefabricated core of a cellulosic honey comb filled with a rigid polyurethane and layers of fiber saturated thermoset polymerized resins. More specifically, the present invention is directed to composites and muticomposites of a cellulosic honey comb filled with rigid polyurethane prefabricated core and a fiber reinforced material, either fibers or woven fibers selected from the group consisting of glass, polyester, carbon and aramid fibers as a mat or cloth saturated with a thermoset polymerized resin selected from the group consisting of catalyzed polyester, catalyzed vinylester, amine catalyzed epoxy and acid catalyzed furan resins.

BRIEF DESCRIPTION OF THE PREFERRED EMBODIMENTS

The present invention is directed to composites and multi-composites of a prefabricated core of a honey comb filled with a rigid polyurethane and layers of fiber saturated thermoset polymerized resins which are building blocks to numerous end products and uses. More specifically the present invention is directed to composites and muticomposites of a cellulosic honey comb filled with rigid polyurethane prefabricated core and a fiber reinforced material, either fibers or woven fibers selected from the group consisting of glass, polyester, carbon and aramid fibers as a mat or cloth saturated with a thermoset polymerized resin selected from the group consisting of catalyzed polyester, amine catalyzed epoxy, catalyzed vinyl ester and acid catalyzed furan resins which provide a dual containment, lightweight, structurally strong, chemically resistant, thermally resistant, earthquake resistant and load bearing structural material.

A composite of the present invention may have a single or more than one prefabricated core of a honey comb filled with rigid polyurethane, preferably a cellulosic honey comb. A multi-composite of the present invention has more than one core of the filled cellulosic honey comb. On either side of each core are layers of fiber saturated thermoset polymerized resins, preferably the catalyzed polyester, catalyzed vinyl ester, amine catalyzed epoxy and acid catalyzed furan resins. The filled honey comb structure provides structural integrity to the composite, is light weight, separates two distinct layers of polymerized resin which comprises multiple layers of fibers and resin and enhances the vibration characteristics of the composite. The composites of the present invention have numerous end uses, the preferred embodiments of products to be described in more detail hereinafter. Some uses of the composites of the present invention are as replacements of wood boards to make fences, as truck bed liners, or as special table tops or surfaces where chemicals and corrosive materials are used and may come into contact with the surface. From these examples and those which follow, it is understood that the composites of the present invention may have considerable variation of dimensions.

The composites of the present invention provide a dual containment structural material since a containment layer of polymerized resin and fibers is on each side of the filled honey comb. Thus, when the composite is used to contain a liquid for example, the first containment of the liquid is the layer of polymerized resin and fibers in contact with the liquid; however, even if the liquid were to penetrate that layer, the second containment of the liquid is the layer of polymerized resin and fibers on the opposite side of the filled honeycomb.

Figure 1:
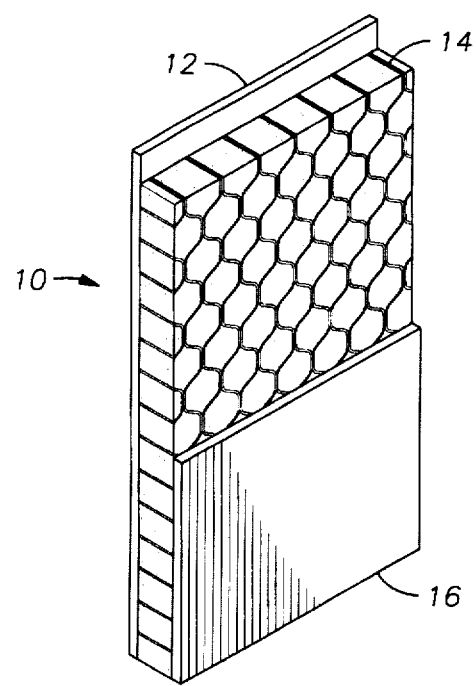
FIG. 1 is a composite of a prefabricated core of a cellulosic honey comb filled with a rigid polyurethane and layers of fiber saturated thermoset polymerized resins illustrating a composite composition of the present invention.

Referring now to FIG. 1, a composite 10 of the present invention is illustrated which comprises a first layer 12 of polymerized resin and fibers, a filled honey comb 14 and a second layer 14 of polymerized resin and fibers. The layers 12 and 14 include fibers which are preferable selected from the group consisting of glass, polyester, carbon and aramid fibers saturated with a thermoset resin preferably selected from the group consisting of catalyzed polyester, catalyzed vinyl ester, amine catalyzed epoxy and acid catalyzed furan resins. The fibers provide a structural base for the polymerized resin and improve the strength and integrity of the resin. Each layer 12 and 14 may be formed so that certain desired properties of the layer are given to the composite of the present invention. A significant property, for example, may be resistance to chemical corrosion. A long list of resins may be employed to give a desired property to the composite of the present invention especially as the outer layer of resin in the polymerized resin and fiber layer of the composite of the present invention to provide the specific known and desired property of that resin, such resins include those thermoset resins made of bisphenol A, bisphenol F, cycloaliphatic epoxies, brominated resins, polyamides, aliphatic amines, cycloaliphatic amines, anhydrides and aromatic amines.

To illustrate the composites of the present invention, the following examples are described:

EXAMPLE 1

On a flat, solid lay-up surface, a sheet of Mylar is laid out on the surface having the dimensions desired, for example 2 feet by 4 feet (2'×4') to form a 2'×4' composite. Over the Mylar is applied a resin rich surface layer, which may be color coated, of a polyester resin. In a hand lay-up as described, a roller is used, whereas in forming small pieces a brush may be used to apply each coat of resin. A 2'×4' cut strand mat of fiberglass is laid over the polyester resin and the roller used to thoroughly wet the mat and apply another layer of polyester resin. A second 2'×4' cut strand mat of fiberglass is laid over the polyester resin and again the roller is used to thoroughly wet the mat and apply another layer of polyester resin. A resin rich layer of polyester resin is applied and then a 2'×4' piece of a cellulosic honey comb filled with rigid polyurethane is set on top the rich layer of resin. The thickness of the honey comb may be from ⅛ inch to 2 inches (⅛" to 2"). The cellulosic honey comb filled with rigid polyurethane are available from WestWind Composites, Inc., Houston, Tex., manufacturers of WESKOR. The density of the polyurethane may vary from 6.0 to 12.0 pounds per cubic foot (pcf). The cellulosic honey comb filled with polyurethane are rigid pieces which become a core or provide the structural integrity to the composite. To the top surface of the honey comb is applied a resin rich layer of polyester resin. A 2'×4' cut strand mat of fiberglass is laid over the polyester resin and the roller used to thoroughly wet the mat and apply another layer of polyester resin. Another 2'×4' cut strand mat of fiberglass is laid over the polyester resin and again the roller is used to thoroughly wet the mat and apply another layer of polyester resin. At least one and preferably two layers of corrosion liner, such as a polyester resin or one of the above named resins is applied. On top is applied a Mylar finish sheet, the Mylar acting as a mold release material. Included in each resin applied is the appropriate catalyst and accelerator to polymerize the resin.

The composite is then pressed while the resins polymerize or cure. The press includes a flat surface piece laid on top of the Mylar and weighted so there is pressure on the composite throughout the cure cycle to maintain the composite flat. The 2'×4' composite after a period of time is fully cured and is then cut into any desired sized pieces.

The pieces or sections of the composite of the present invention can be assembled to produce any number of specific products. The specific end use of the composite will determine the thickness of the layers, the number of layers of polymerized resin and fibers and the specific resins and fibers employed.

EXAMPLE 2

Following the procedure of Example 1, a composite is produced except that a vinyl ester resin is used instead of a polyester. The vinyl ester resin may be Dow Chemical's DERAKANE 470-36. Using the composite of this Example, a trench liner 20 is produced.

Figure 2:
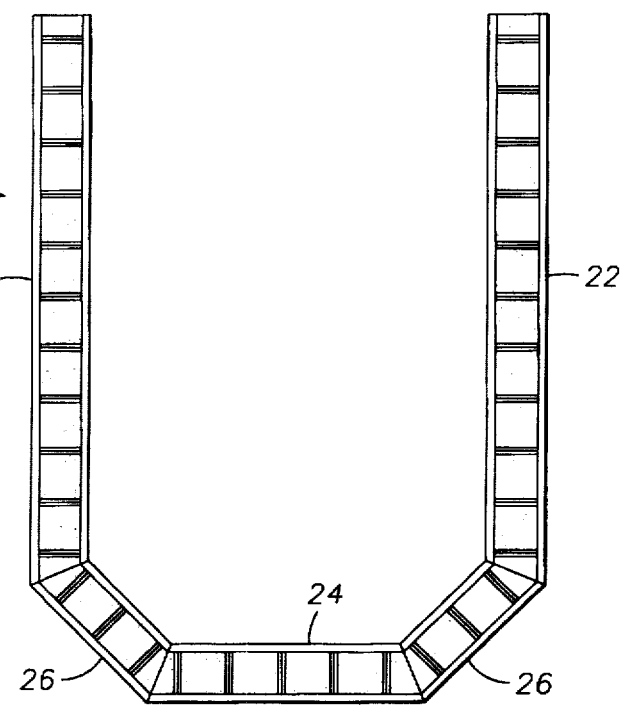
FIG. 2 is a cross-section of a trench liner made from a composite composition of the present invention.

Referring to FIG. 2, the trench liner 20 has side sections 22, a bottom section 24 and two intermediate sections 26. The sections are cut from the 2'×4' composite and placed on a lay-up surface to align each section with an equal small spacing between each section. The adjacent sections are taped one to the other. The taped sections are placed over a first jig (the taped sections positioned 180° or turned over from that shown and hanging over the jig like a horse blanket) which allows each section to be positioned in the desired shape as shown in FIG. 2, i.e. the side sections 90° to the bottom section and the intermediate section at about 45° to the bottom section. Using the same vinyl ester resin, the taped seams are coated with layers of the resin and allowed to cure. The trench liner 20 which now has rigidity in the desired shape is then placed into a second jig to weld the inside seams. The second jig has the size and shape of the outside of the liner. The inside seams are filled with the same vinyl ester resin and allowed to cure. In each instance, the jig together with presses maintains the composite liner in the desired shape during the filling and curing of the seams.

It is clear that composite products having various shapes may be made from the composites of the present invention. By choosing the resins and especially the outside layers of resin, chemical resistance or thermal resistance or other desired properties can be made a part of the composite of the present invention.

Figure 2A:
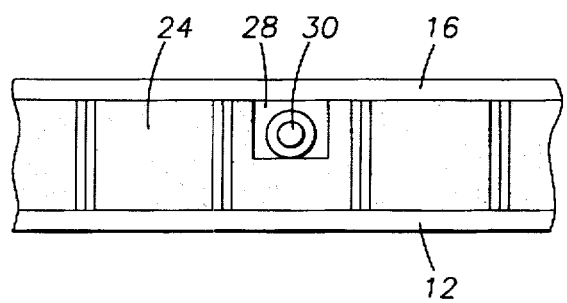

Referring now to FIG. 2a, an alternate bottom section 24 is shown having a notch 28 with a liquid sensor 30 in the notch 28. This alternative provides a detector system to the leakage of liquid through the top layer 16 before it reaches the layer 12. Thus, the composite 10 of the present invention not only has a double containment feature but may be provided with a detector system for liquids before reaching the second containment. The wiring and materials for such a detector system are known to the art.

Figure 3:
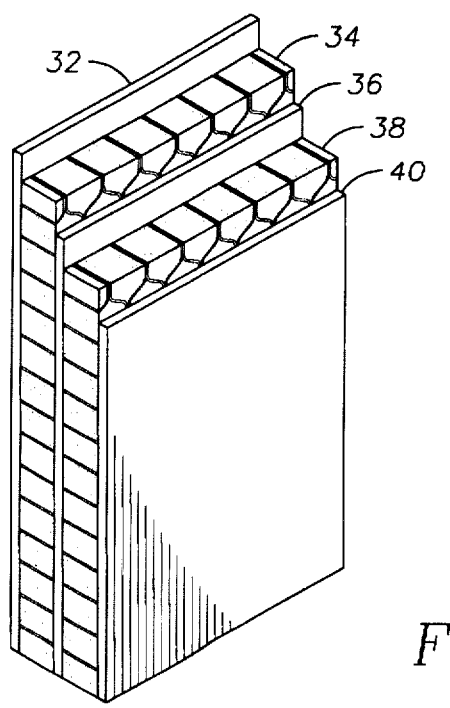
FIG. 3 is a multi-composite having more than one prefabricated core of a cellulosic honey comb filled with a rigid polyurethane and layers of fiber saturated thermoset polymerized resins illustrating a multi-composite composition of the present invention.

The composites of the present invention may have more than one honey comb filled core used to produce the composite. FIG. 3 illustrates a composite having more than one filled honey comb. The composite 10 shown has an outer reinforcement layer 32, a first filled honey comb 34, a bonding layer 36, a second filled honey comb 38 and a outer layer 40 which may incorporate corrosion resistance or other properties. A specific example of such a composite follows:

EXAMPLE 3

On a flat, solid lay-up surface, a sheet of Mylar is laid out on the surface having the dimensions desired, for example to form a 4'×8' composite. Over the Mylar is applied a resin rich surface layer of a polyester resin, e.g. Dow Chemical's DERAKANE 470-36. Two (2) to six (6) cut strand mats of fiberglass are cut and each mat is laid over a layer of the polyester resin and a roller is used to thoroughly wet the mat, i.e. making sure that the resin fully impregnates and permeates the mat, and then another layer of polyester resin is applied. A first 4'×8' cellulosic honey comb filled with rigid polyurethane is set on top the rich layer of resin. The thickness of the honey comb may be from ⅛ inch to 2 inches (⅛" to 2"). The cellulosic honey comb filled with rigid polyurethane becomes a core or provides structural integrity to the composite. To the top surface of the honey comb is applied a resin rich layer of polyester resin. A layer including a mat of fiberglass is laid over the polyester resin and the roller used to thoroughly wet the mat and apply another rich layer of polyester resin. A second 4'×8' cellulosic honey comb filled with rigid polyurethane is set on top the rich layer of resin. Two (2) to six (6) 4'×8' cut strand mats of fiberglass are cut to provide a reinforcement layer on top of the second filled honey comb and each mat is laid over a layer of the polyester resin and a roller is used to thoroughly wet the mat. At least one and preferably two layers of corrosion liner, such as a polyester resin or one of the above named resins is applied. On top is applied a Mylar finish sheet, the Mylar acting as a mold release material. Included in each resin applied is the appropriate catalyst and accelerator to polymerize the resin.

The composite is then pressed while the resins polymerize or cure. The press includes a flat surface piece laid on top of the Mylar and weighted so there is pressure on the composite throughout the cure cycle to maintain the composite flat. The 2'×4' composite after a period of time is fully cured and is then cut into any desired sized pieces. Included in each resin applied is the appropriate catalyst and accelerator to polymerize the resin.

The foregoing example has two filled honey combs; however, it is clear that combinations including more than two filled honey combs may be produced. Depending on the end use of the composite, the choice of resin and fibers and the number of layers of resin can produce composite of varying properties.

Figure 4:
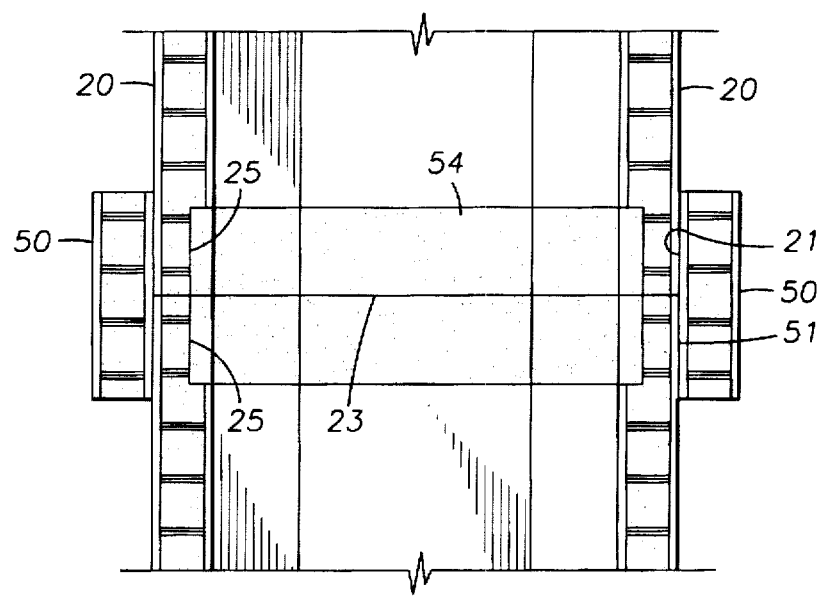
FIG. 4 is a joint connecting two sections of trench liners with a saddle all made from composite compositions of the present invention.

Another example of a composite having more than one filled honey comb is illustrated in FIG. 4. This figure illustrate the joining of sections of trench liners 20 as illustrated in FIG. 2. The two sections 20 are abutted and placed into a saddle 50 in the field. The saddle 50 is produced similarly as the trench section 20; however, the inside surface 51 has the dimensions of the outside surface 21 of section 20. A bonding paste using the resin, catalyst and accelerator is applied to both surfaces 51 and 21 before the sections 20 and placed into the saddle 50. The sections 20 may be cut to any lengths and are easily made in either 4' or 8' lengths. A suitable length for the saddle is 8", providing 4" on each side of the joint 23. It is noted that the ends of sections 20 have a notch 25 at the ends. This permits an inside seal 54 to be made with a rich layer(s) of resin or resin paste and not cause a raised portion which may inhibit the flow of liquids in the trench 20.

Figure 5:
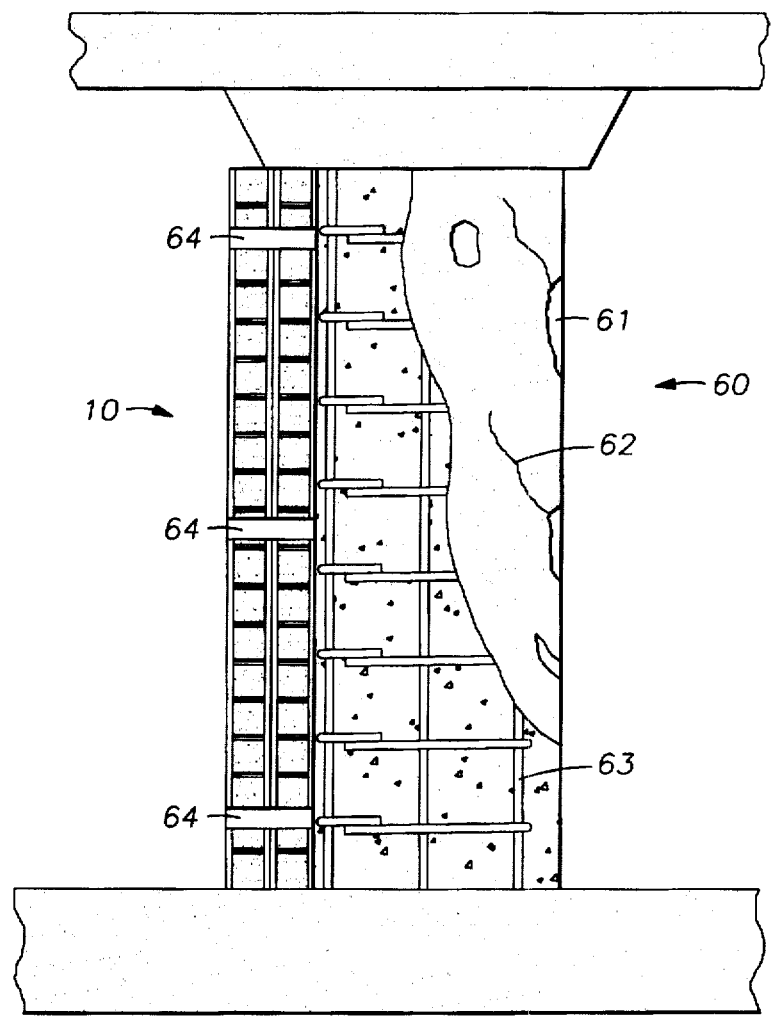
FIG. 5 is a mold made from composite or multi-composite compositions of the present invention for repairing a column, beam, or other similar structure, such as a column, beam, or other similar structure of a bridge, parking garage, or other reinforced concrete structure.

Referring now to FIG. 5, the composites of the present invention may be use to repair and replace columns, such as bridge columns or columns in parking garages. A damaged column 60 is shown (on the right hand side) with chips 61 and cracks 62. The damaged concrete is removed to the re-bar 63. A composite 10 of the present invention, having a horizontal cross-sectional shape of a rectangle or a circle, having overall dimensions to encircle the column 60 is placed into position around the column. A series of openings 64 are vertically spaced in the composite 10 for introduction of a fortifying material to fill the space between the composite 10 and the remaining portion of the column 60 after the damaged concrete has been removed. The fortifying material is preferably polymer concretes such as the epoxy based polymer concretes since these are fast setting or curing and set with little shrinkage. A specific example is the epoxy based polymer concrete which utilizes select graded and blended aggregates suspended in a polyamine cured epoxy binder sold under the trade name "PC-1400", a product of Gulf Coast Paint Manufacturing in Mobile, Ala. The fortifying material may be a reinforced concrete. The fortifying material may be introduced into one of the openings, by gravity above the level inside or by pumping in a lower opening. The opening may also be used to introduce vibrating equipment to eliminate air pockets in the fortifying material. The openings 64 may have valves in the openings. The openings are closed or plugged as the fortifying material introduced into the space between the composite 10 and the column 60 rises to that opening. The composite 10 of the present invention becomes the outer surface of the repaired column 60 and is more than a form for the fortifying material. The composite 10 being light weight is capable of being handled easily in the field; however, the composite 10 provides substantial physical strength and vibration properties which are unique in the repairs of columns.

The possible products or end uses of the composites of the present invention are substantial and are not all set forth in detail.

We claim:

1. A composite comprising:
   a cellulosic honey comb filled with a rigid polyurethane prefabricated core, said core having two sides; and
   a multiple number of layers of fiber reinforced material adhering to each side of said core, said fibers selected from the group consisting of glass, polyester, carbon and aramid fibers, saturated with a thermoset resin selected from the group consisting of catalyzed polyester, catalyzed vinyl ester, amine catalyzed epoxy and acid catalyzed furan resins.

2. A composite according to claim 1 wherein said fibers on each side of said core are the same fibers encapsulated in the same resin.

3. A composite according to claim 1 wherein said fibers on each side of said core are different fibers.

4. A composite according to claim 1 wherein said resin on each side of said core are different resins.

5. A multi-composite according to claim 1 wherein there are more than one core of prefabricated cellulosic honey comb filled with rigid polyurethane.

6. A multi-composite according to claim 5 wherein there are at least two cores of cellulosic honey comb filled with rigid polyurethane.

7. A multi-composite according to claim 6 wherein there are at least two cores of cellulosic honey comb filled with rigid polyurethane and the shape of said cores are U-shape for a drain.

8. A multi-composite according to claim 6 wherein the inside of said inner core has fibers encapsulated in a polyester resin and the outside of said outer core has fibers encapsulated in an amine catalyzed epoxy.

* * * * *